United States Patent [19]

Saccardi

[11] Patent Number: 4,858,113
[45] Date of Patent: Aug. 15, 1989

[54] RECONFIGURABLE PIPELINED PROCESSOR

[75] Inventor: Raymond J. Saccardi, Laurel, Md.

[73] Assignee: The United States of America as represented by the Director of the National Security Agency, Washington, D.C.

[21] Appl. No.: 38,382

[22] Filed: Apr. 10, 1987

[51] Int. Cl.⁴ .............................................. G06F 7/00
[52] U.S. Cl. ..................................... 364/200; 364/730
[58] Field of Search ... 364/200 MS File, 900 MS File, 364/736, 730, 748

[56] References Cited

U.S. PATENT DOCUMENTS

| | | | |
|---|---|---|---|
| 3,787,673 | 1/1974 | Watson et al. | 364/200 |
| 4,325,120 | 4/1982 | Colley et al. | 364/200 |
| 4,497,023 | 1/1985 | Moorer | 364/200 |
| 4,525,796 | 6/1985 | Omoda et al. | 364/730 |
| 4,553,203 | 11/1985 | Raw et al. | 364/200 |
| 4,589,067 | 5/1986 | Porter et al. | 364/200 |
| 4,599,721 | 7/1986 | Murray | 370/112 |

Primary Examiner—Gary V. Harkcom
Assistant Examiner—C. H. Lynt
Attorney, Agent, or Firm—John R. Utermohle; Thomas O. Maser

[57] ABSTRACT

The reconfigurable pipelined processor includes a plurality of memory devices and arithmetic units interconnected by cross bars for transferring raw and processed data therebetween. A counter is connected with the cross bar to provide a source of addresses for the memory devices. At least one variable tick delay device is connected with each memory and arithmetic unit to variably control the input and output operations thereof to selectively delay the memory devices and arithmetic units to align the data for processing in a selected sequence.

6 Claims, 5 Drawing Sheets

| TIME | REG 1 | REG 2 | REG 3 | REG 4 | REG 5 | REG 6 |
|---|---|---|---|---|---|---|
| $T_1$ | $a_1$ | $b_1$ | $c_1$ | | | |
| $T_2$ | $a_2$ | $b_2$ | $c_2$ | $a_1 \times b_1$ | $c_1$ | |
| $T_3$ | $a_3$ | $b_3$ | $c_3$ | $a_2 \times b_2$ | $c_2$ | $(a_1 \times b_1) + c_1$ |
| $T_4$ | $a_4$ | $b_4$ | $c_4$ | $a_3 \times b_3$ | $c_3$ | $(a_2 \times b_2) + c_2$ |
| $T_5$ | $a_5$ | $b_5$ | $c_5$ | $a_4 \times b_4$ | $c_4$ | $(a_3 \times b_3) + c_3$ |
| $T_6$ | $a_6$ | $b_6$ | $c_6$ | $a_5 \times b_5$ | $c_5$ | $(a_4 \times b_4) + c_4$ |
| $T_7$ | | | | $a_6 \times b_6$ | $c_6$ | $(a_5 \times b_5) + c_5$ |
| $T_8$ | | | | | | $(a_6 \times b_6) + c_6$ |

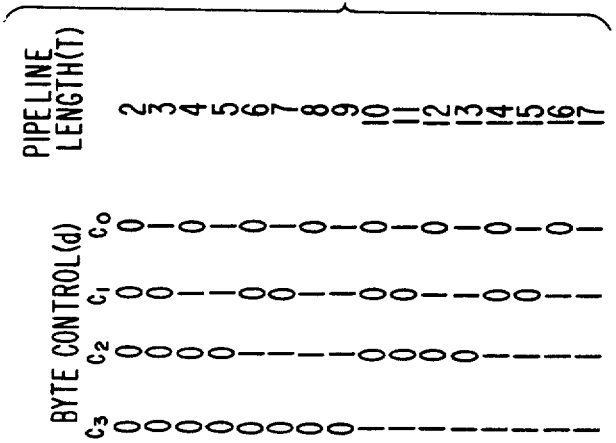
FIG. 7
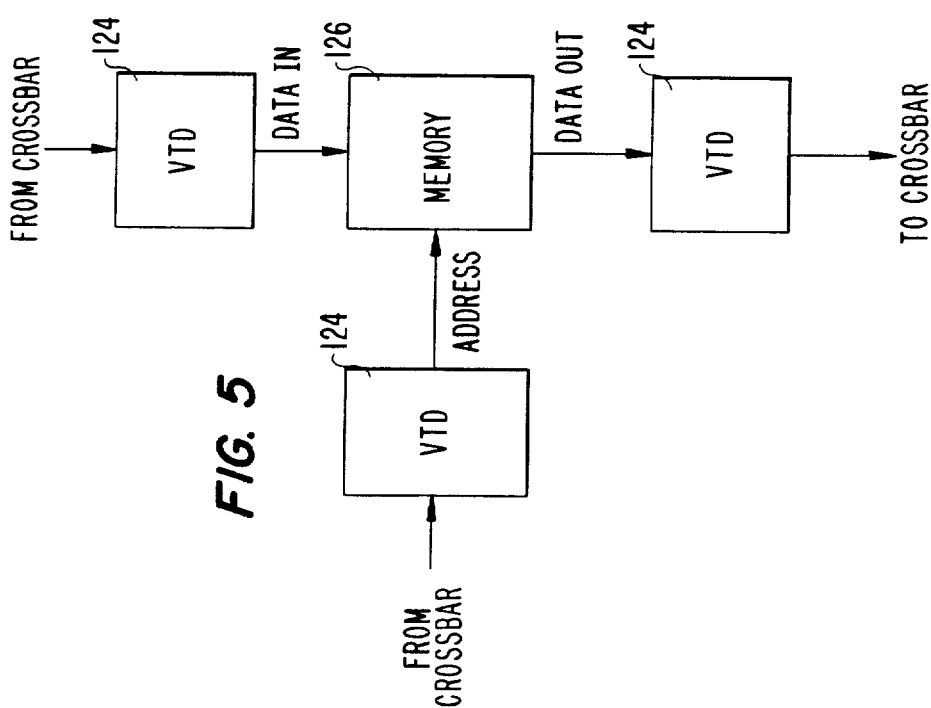
FIG. 8
FIG. 5

RECONFIGURABLE PIPELINED PROCESSOR

BACKGROUND OF THE INVENTION

The present invention relates to a method and apparatus providing reconfigurable pipelined digital processing for use in massively parallel multi-processing systems. When pipelined calculations are to be performed, it is often necessary to delay one partial result by some amount of time before combining it with another partial result. Thus, for example, in the calculation $$(a_1 \times b_1) + c_1$$

the $c_1$ value must be delayed during the computations $a_1 \times b_1$. As shown schematically in FIG. 1, $a_1$, $b_1$, and $c_1$ are results of a previous part of the pipeline, and the three operands are supplied as inputs to registers 1, 2, and 3, respectively, on every clock pulse. The operands $a_1$ and $b_1$ are multiplied in a multiplier 2 with the result being stored in register 4. In the meantime, $c_1$ is held or delayed in register 5 during multiplication of $a_1 \times b_1$. The product of $a_1 \times b_1$ is added to $c_1$ in an adder 4 and the sum is stored in register 6. FIG. 2 is a table showing the contents of each register for clocks pulses $T_1-T_8$.

In the design of a pipeline, it is important that there be proper connections between registers and arithmetic functional units, and that there be proper timing alignment of data for processing. The reconfigurable pipelined processor of the present invention provides both of these features.

BRIEF DESCRIPTION OF THE PRIOR ART

Pipelined processors are well-known in the patented prior art as evidenced by U.S. Pat. No. 4,525,796. Typically, flexible processors of the prior art are configured as schematically represented in FIG. 3. A plurality of memory devices 6, 8, 10, 12, and a plurality of arithmetic units 14, 16, 18 are interconnected via a cross bar device 20. The cross bar provides the necessary flexibility, whereby the output of any device or unit may be connected with the input of any device or unit. This affords flexibility for non-pipelined applications and for selected pipelined applications where the delay of intermediary pipelined data is not required.

For example, for $$c_i = a_i + b_i \text{ for } i = 1 - n,$$

then in FIG. 3, let
MEMORY 1 hold $a_i$
MEMORY 2 hold $b_i$
MEMORY 3 store results $c_i$
In operation, the cross bar is controlled to allow the following connections:

MEMORY 1 → operand 1 of MULT/DIV 1

MEMORY 2 → operand 2 of MULT/DIV 1 output MULT/DIV 1 → MEMORY 3

When it is necessary to configure a more complex pipeline where multiple partial results must be delayed by different amounts of time, the architecture of FIG. 3 has serious drawbacks resulting from the lack of consideration for data timing alignment. Prior flexible designs make no provisions for storing multiple partial results for variable numbers of clock periods.

The present invention was developed in order to overcome these and other drawbacks of prior pipelined processors by providing a reconfigurable pipelined processor providing variable timing delays to align the data for processing in a selected sequence. The processor of the present invention thus provides inherent flexibility for massively parallel multi-processing systems.

SUMMARY OF THE INVENTION

Accordingly, it is a primary object of the present invention to provide a method and apparatus for processing data in a reconfigurable pipelined processor. The processor includes a plurality of memory devices for storing bits of data, a plurality of arithmetic units for performing arithmetic functions with the data, and a cross bar device for connecting the memory devices with the arithmetic units for transferring data therebetween. Counters are connected with the cross bar in order to provide a source of addresses for the memory devices. At least one variable tick delay device is connected with each of the memory devices and arithmetic units for variably controlling the input and output operations thereof to selectively delay the memory devices and arithmetic units to align the data for processing in a selected sequence.

It is another object of the invention to provide at least one independent variable tick delay device connected with the cross bar for re-aligning data during processing in a selected sequence.

According to a more specific object of the invention, each variable tick delay device includes a plurality of multiplexers each having a plurality of pipelined registers connected therewith. The number of registers in the pipelined data path is determined by the control bits delivered to each multiplexer.

BRIEF DESCRIPTION OF THE FIGURES

Other objects and advantages of the subject invention will become apparent from a study of the following specification when viewed in the light of the accompanying drawing, in which:

FIG. 5 is a block diagram of a memory device of the processor of FIG. 4 having variable tick delay devices connected with each port thereof;

FIGS. 6 and 6A are schematic diagrams of a variable tick delay device and control register therefor, respectively;

FIG. 7 is a table illustrating the relationship between the control bits and the number of registers required for the variable tick delay device of FIG. 6;

FIGS. 8 and 9 are schematic examples of a sparse matrix and a processor configured for the sparse matrix, respectively, for illustrating the operation of the reconfigurable pipelined processor according to the invention.

DETAILED DESCRIPTION

Figures 1, 2:
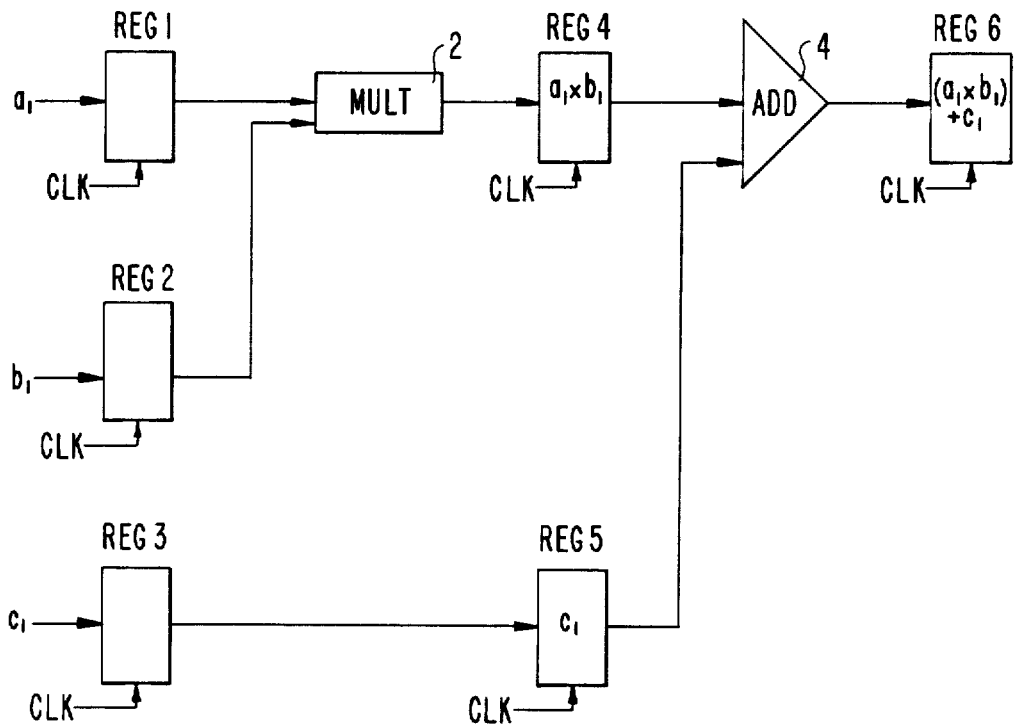
FIG. 1 is a schematic illustration of a simple pipelined processing system for performing a simple calculation.
FIG. 2 is a table illustrating the contents of the registers of the processor of FIG. 1 at various times in the processing cycle.
Figure 4:
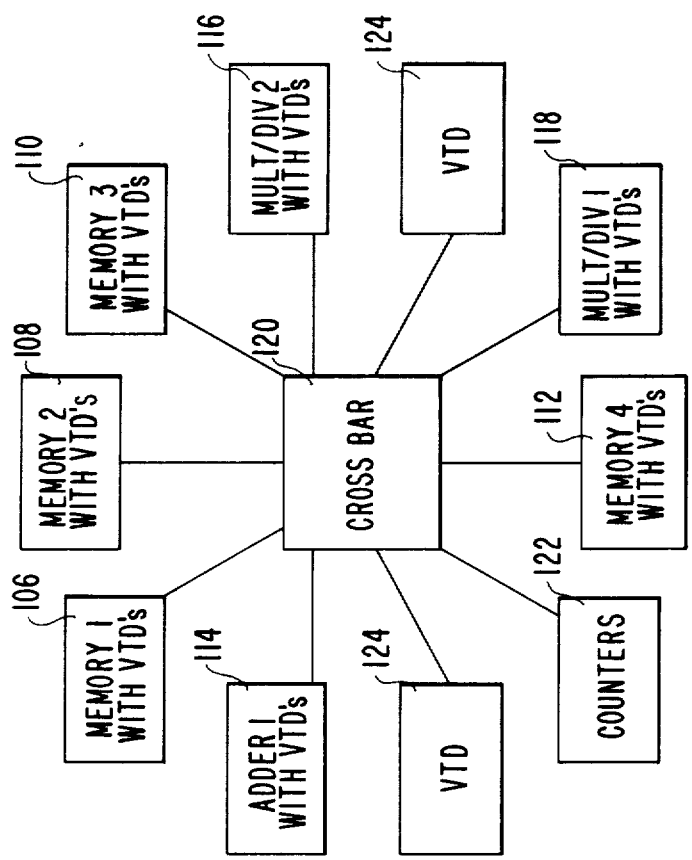
FIG. 4 is a block diagram of a reconfigurable pipelined processor according to the invention.
Figure 3:
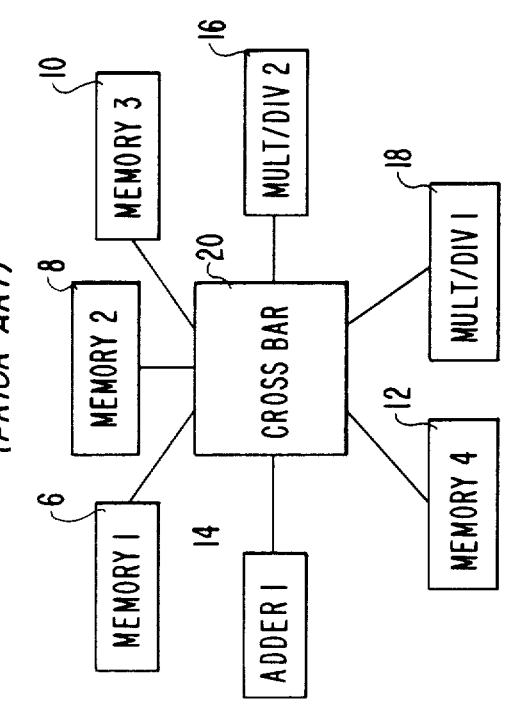
FIG. 3 is a block diagram of a pipelined processor of the prior art.

Referring to FIG. 4, the reconfigurable pipelined processor of the present invention comprises a plurality of memory devices 106, 108, 110, 112, a plurality of arithmetic units 114, 116, 118, all of which are interconnected via a cross bar device 120. Each memory device stores bits of data, whether raw or processed. The arithmetic units perform arithmetic functions with the data. Thus the unit 114 is an adder for adding data together while the units 116 and 118 are combination multipliers and dividers for multiplying and/or dividing data. While the pipelined processor of FIG. 4 is shown comprising four memory devices and three arithmetic units, it will be appreciated by those skilled in the art that any number of memories and arithmetic units may be provided in accordance with the complexity of the processing operations being performed.

At least one counter 122 is connected with the cross bar to provide a source for addresses to the memory devices. As will be developed in greater detail below, the clock rate or period provides the timing control of the elements of the processor for data transfer and for functional operation of each element.

As shown in FIG. 4 and as will be discussed in greater detail below, each of the memory devices and arithmetic units includes a variable tick delay (VTD) device. The VTD devices variably control the input and output operations of the memories and the arithmetic units to selectively delay these elements in order to align the data for processing in a selected sequence. Thus while the cross bar provides connectivity between the elements of the pipelined processor, the VTD's provide data alignment relative to the clocking period for appropriate data processing.

As shown in FIG. 5, the VTD's 124 are preferably used as inputs to and outputs from each memory 126. Similarly, the VTD's are used as inputs to each arithmetic unit. If desired, VTD's may also be used as outputs from each arithmetic unit. Also, as shown in FIG. 4, a variable tick delay device may be provided as an independent element connected directly with the cross bar for re-aligning data during processing in a selected sequence.

Figure 6:
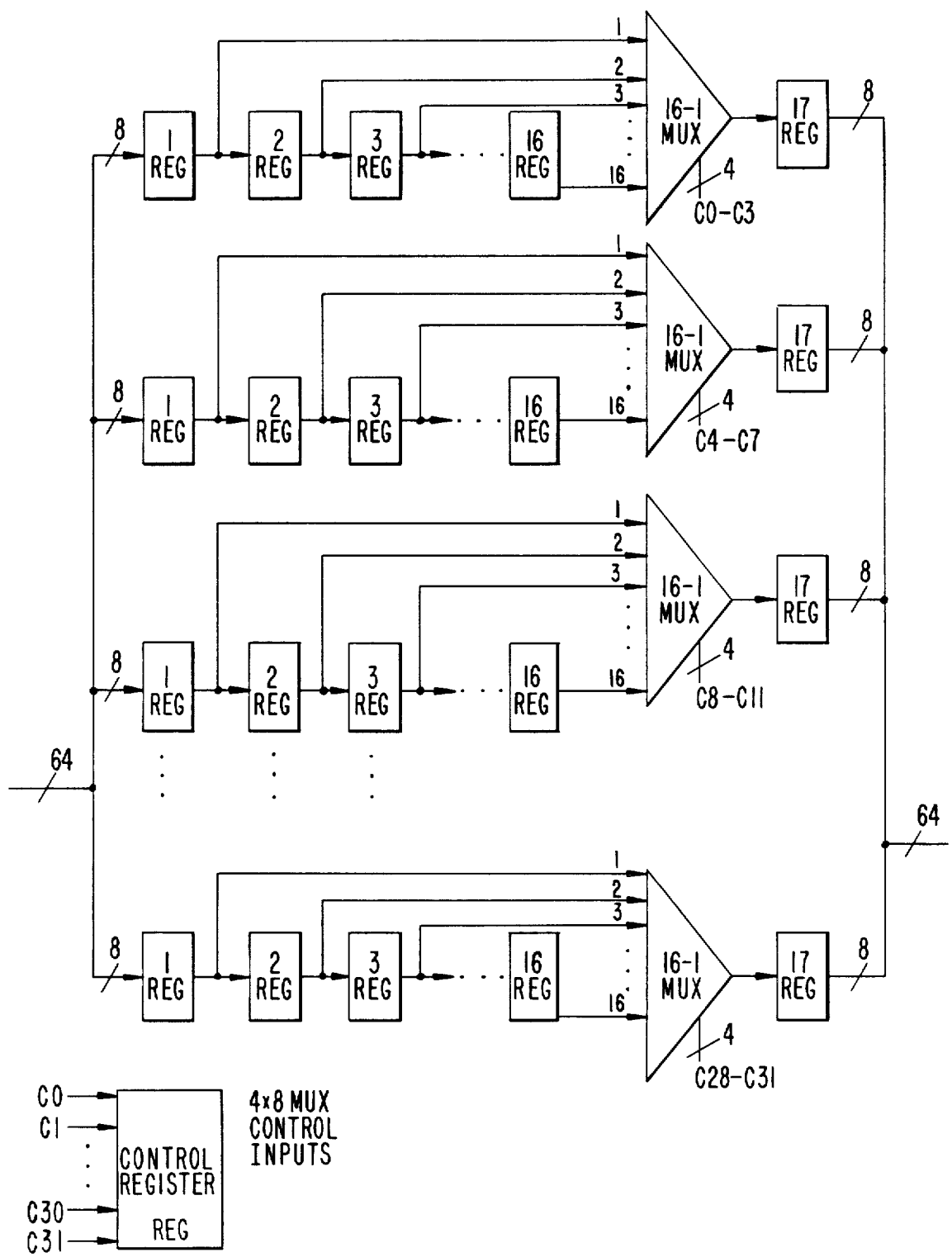

A sample variable tick delay device is shown in FIGS. 6 and 6A. It includes a plurality of multiplexers the number of which is determined by the number of data bits, and each multiplexer has a plurality of serialled input registers and output registers connected therewith. In the example of FIGS. 6 and 6A, the VTD has 64 bits of data input, 4 bits of data output, and 32 bits of control ($c_0$–$c_{31}$). The 64 bits of data are independently controlled as bytes by means of four control bits for each byte. The number of control bits required can be substantially reduced by controlling all 64 bits by four control lines or by controlling two 32 bit data paths with four bits of control per path. Regardless of whether the data bits are controlled as bytes, half words (32 bits) or full words (64 bits), the control bits determine the number of registers in the pipelined data path as shown in FIG. 7. Simplified examples of variable tick delay devices are models L29C520/L29C521 manufactured by Logic Devices Incorporated.

Figure 9:
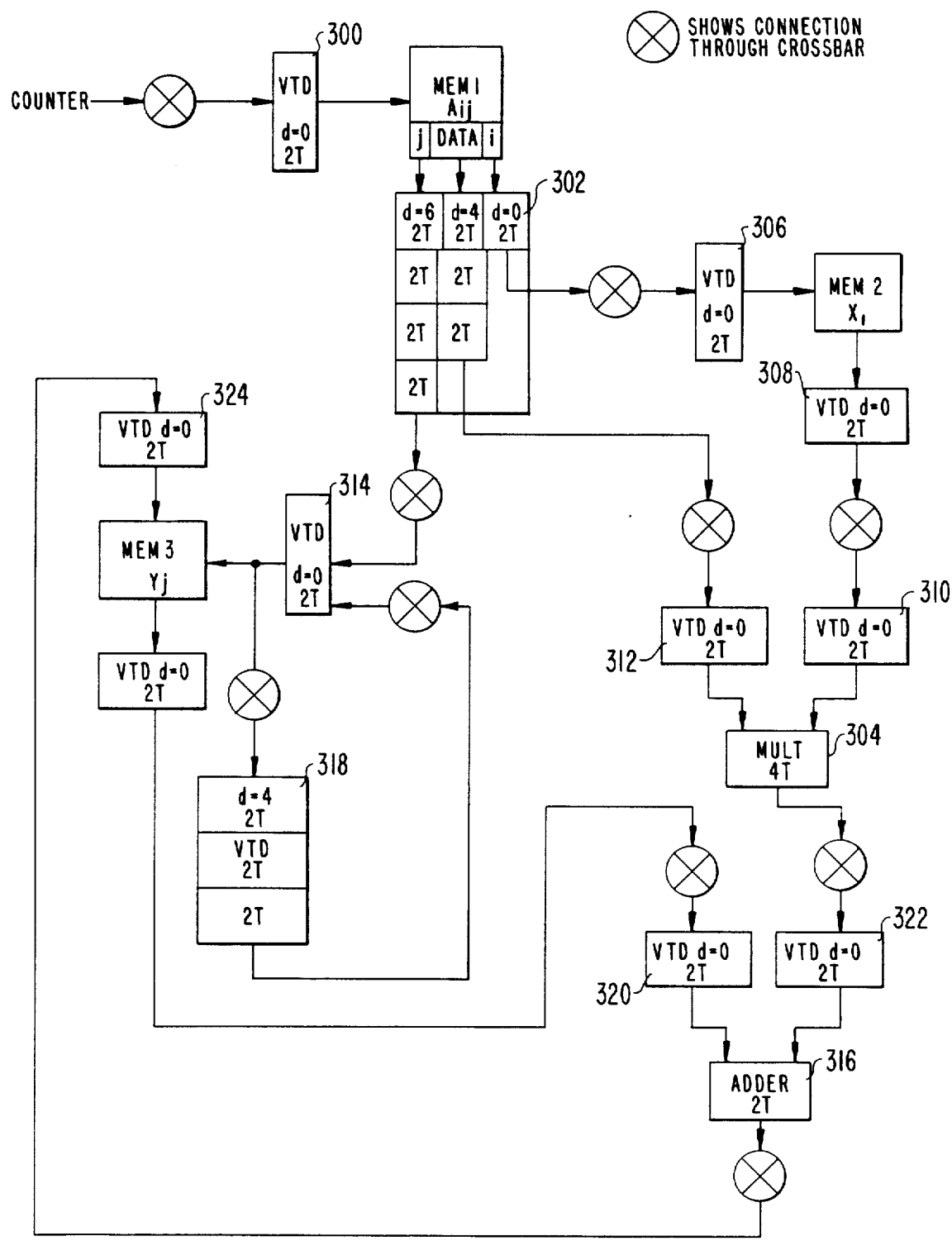

In the operation of the reconfigurable pipelined processor of FIG. 4, input data is loaded into the memory devices and the cross bar device is operated to selectively transfer the data between the memory devices and the arithmetic units in accordance with a predetermined clocking rate. The arithmetic units are operated to perform arithmetic functions with the data in accordance with the clocking rate. Flexibility, i.e. reconfiguration, of the processor is accomplished by varying the delay of the input and output of data from the memory devices and arithmetic units relative to the clocking rate in order to align the data for processing in a selected sequence. The processed data is then unloaded from the memory device. A complete understanding of the operation of the reconfigurable pipelined processor of the invention by way of an example is illustrated in FIGS. 8 and 9. This example is for processing a $1 \times n$ row vector of real numbers multiplied by a sparse square matrix ($n \times n$, with many zero entries) of real numbers to yield a $1 \times n$ row vector as the result as shown in FIG. 8.

Rather than store the many zero entries of the sparse matrix, only the non-zero entries will be stored along with a tag field containing the i and j values corresponding with the data's row (i) and column (j) location in the square matrix.

In order to concentrate on the unique features of the invention, the following simplification will be used in describing the operation of the example of FIG. 9:

(1) assume that the memory devices are large enough to store the vectors and the sparse matrix;
(2) ignore the word size (number of bits) of data and tag field (i and j values); and
(3) ignore cross bar registration delays and let the symbol ⊗ denote a connection through a cross bar.

The processor configuration of FIG. 9 includes three memory devices. MEM 1 is assigned the sparse matrix $A_{ij}$ (data and tags), MEM 2 is assigned the X vector, and MEM 3 is assigned the Y vector (results).

The symbols d and T shown in the VTD's of FIG. 9 represent the byte control and pipeline length, respectively, as defined in FIG. 7 for a VTD.

MEM 1 is read sequentially as indicated by the counter driving the address VTD 300 for MEM 1 via the cross bar connection. On every clock pulse, MEM 1 data and tag fields are loaded into the data output VTD 302 of MEM 1 where the following delays are programmed in the VTD:

(1) tag i, d=0; 2T through VTD 302
(2) data, d=4; 6T through VTD 302; delayed by 4 to allow readout of $X_i$ quantity to be aligned with MEM 1 data; and
(3) tag j, d=6; 8T through VTD 302; delayed to line up data coming from $Y_j$ memory with $X_i \times A_{ij}$ from the multiplier 304.

The i tag will supply an address through the cross bar to the memory MEM 2 address VTD 306 which is set to d=0, corresponding to the minimum of two levels of registration. The memory MEM 2 data is loaded into the MEM 2 data output VTD 308 which is also set to d=0. The data output from the VTD 308 drives one operand VTD 310 of multiplier 304 while the delayed data from the $A_{ij}$ memory's MEM 1 VTD 302 drives the other operand VTD 312 of the multiplier 304. Both of the operands VTD 310 and VTD 312 are set to d=0. The multiplier 304 performs floating point multiplication using a four-tick (4T) pipelined algorithm having four levels of registration.

During the 4T duration of the multiplication, the delayed j tag drives the address VTD 314 of the memory MEM 3. Since the memory MEM 3 will provide the storage for the resulting vector $Y_j$, it must be designed to run at two times the arithmetic pipeline rate in order to perform the summation from the adder 316 and store of the result. Since the j tag must be saved in order to provide a storage address after the summation is performed, the address VTD 314 of MEM 3 will drive memory MEM 3 and also VTD 318 via a cross bar. The VTD 318 is set to d=4 (6T) in order to delay the j tag so as to be aligned with the data output from the adder 316. The data read from the memory MEM 3 drives one operand VTD 320 of the adder 316 while the output of the multiplier 304 drives the other operand VTD 322 of the adder 316. The adder 316 performs a floating point addition requiring two ticks 2T. The sum output from the adder 316 is thus aligned with the stored j tag and they feed the memory MEM 3 via the data-in VTD 324 and the address VTD 314, respectively.

The reconfigurable pipelined processor and method for processing according to the invention thus enable the pipeline to be reconfigured as desired with relative ease since the alignment of data is provided in accordance with proper byte control of the variable tick delay devices.

While in accordance with the provisions of the patent statutes the preferred forms and embodiments of the invention have been illustrated and described, it will be apparent to those skilled in the art that various changes and modifications may be made without deviating from the inventive concepts set forth above.

What is claimed is:

1. A reconfigurable pipelined processor for processing data, comprising:
    (a) a plurality of memory devices for storing bits of data;
    (b) a plurality of arithmetic units for performing arithmetic functions with the data;
    (c) cross bar means for connecting said memory devices with said arithmetic units for transferring data therebetween;
    (d) at least one counter connected with said cross bar means for providing a source of addresses to said memory devices;
    (e) at least one variable tick delay device connected with each of said memory devices and arithmetic units; and
    (f) means for providing control bits to said variable tick delay device for variably controlling the input and output operations thereof to selectively delay said memory devices and arithmetic units to align the data for processing in a selected sequence.

2. Apparatus as defined in claim 1, wherein a variable tick delay device is connected with each input and output of each of said memory devices and arithmetic units.

3. Apparatus as defined in claim 2, and further comprising at least one independent variable tick delay device connected with said cross bar means for re-aligning data during processing in a selected sequence.

4. Apparatus as defined in claim 3, wherein said variable tick delay devices each comprise a plurality of multiplexers each having a plurality of pipelined registers connected therewith, the number of registers in the pipelined data path being determined by the control bits delivered to each multiplexer.

5. A method for processing data in a pipelined processor including a plurality of memory devices and arithmetic units interconnected by cross bars, comprising the steps of
    (a) loading input data into the memory devices;
    (b) selectively operating the cross bars to selectively transfer the data between the memory devices and the arithmetic units in accordance with a predetermined clocking rate;
    (c) controlling the operation of the arithmetic units to perform arithmetic functions with the data;
    (d) varying the delay of the input and output of data from the memory devices and arithmetic units relative to the clocking rate to align the data for processing in a selected sequence; and
    (e) unloading the processed data from the memory device.

6. The method as defined in claim 5, and further comprising the step of controlling read/write signals to the memory devices to facilitate the transfer of data relative thereto.

* * * * *